Dec. 29, 1959   J. E. BROSSEAU ET AL   2,919,337
TEMPERATURE CONTROL FOR HEATING UNITS
Filed June 18, 1956   3 Sheets-Sheet 1
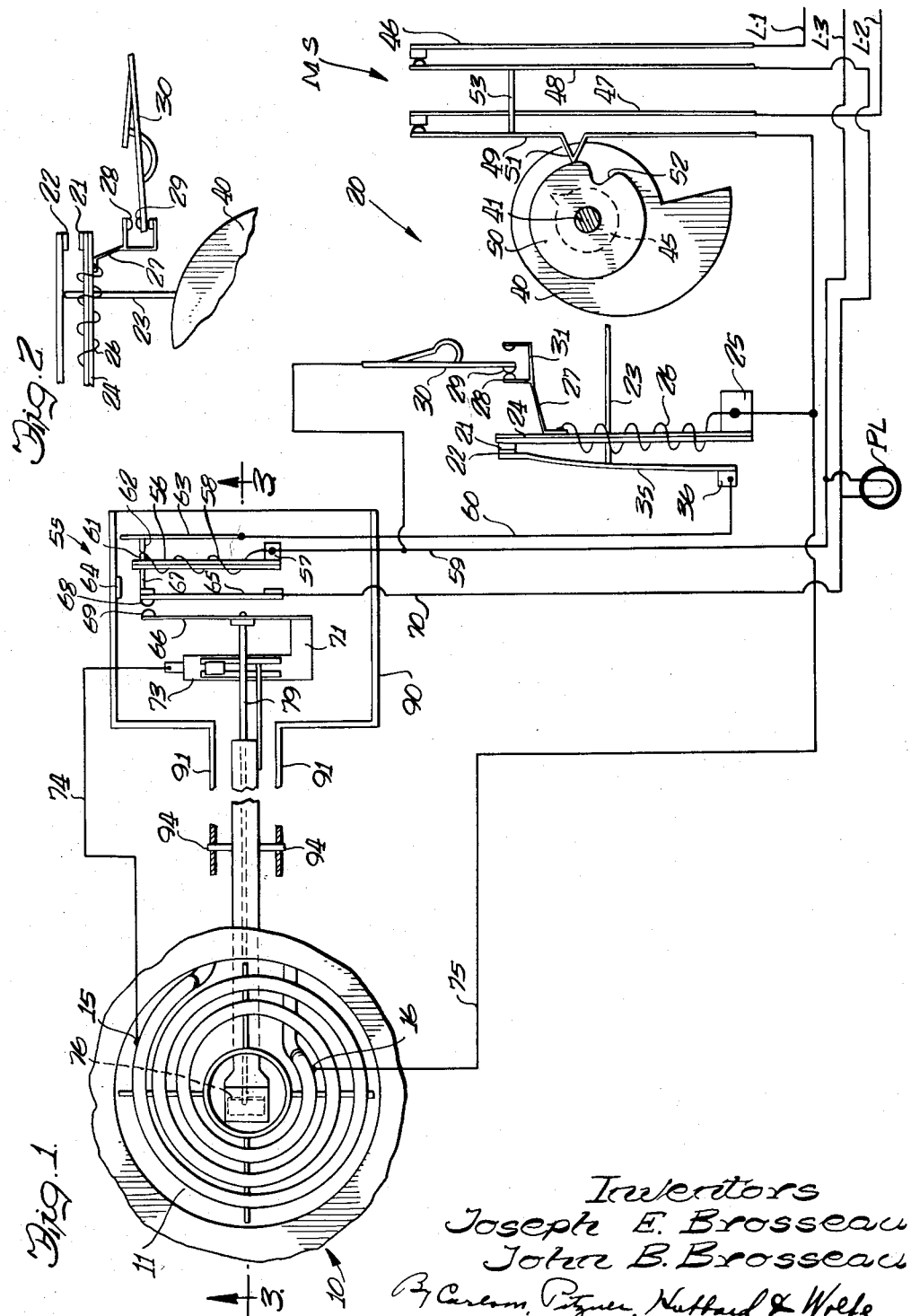
Inventors
Joseph E. Brosseau
John B. Brosseau
By Carlson, Pitzner, Hubbard & Wolfe
Attorneys

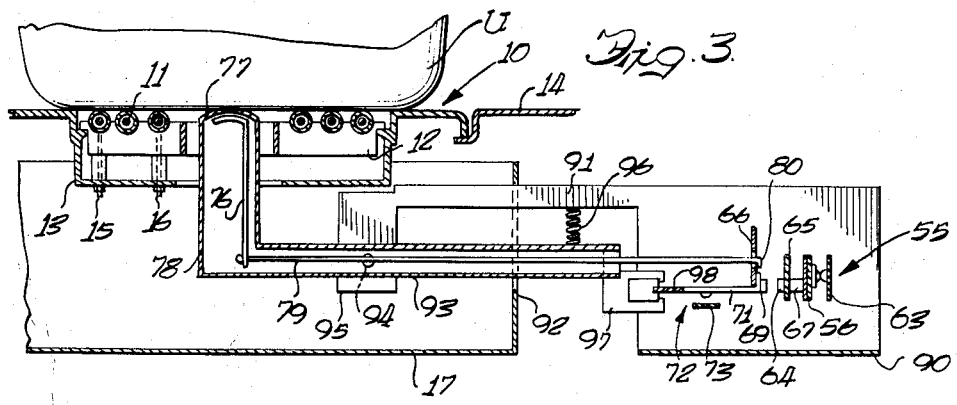

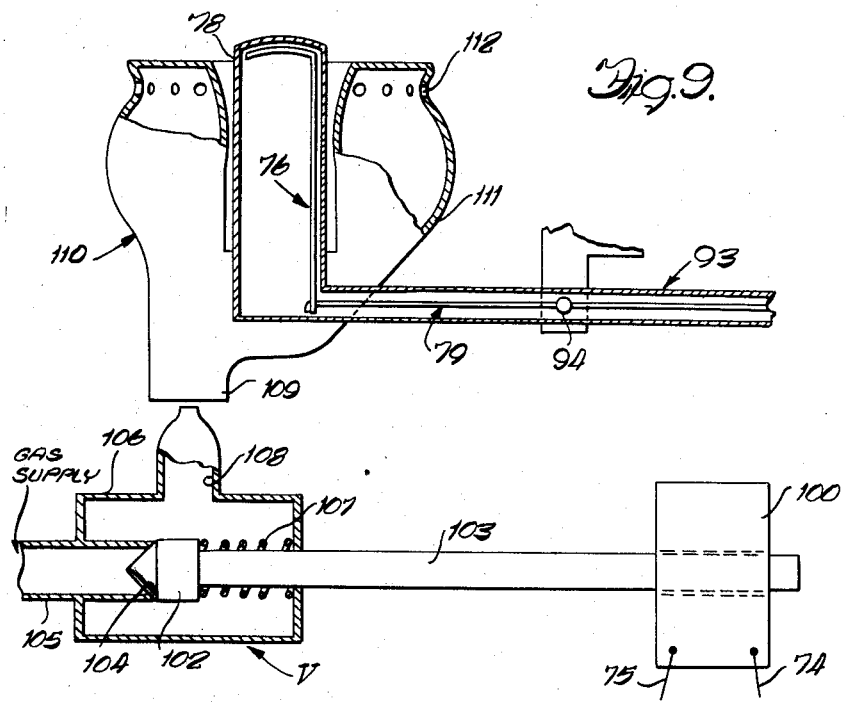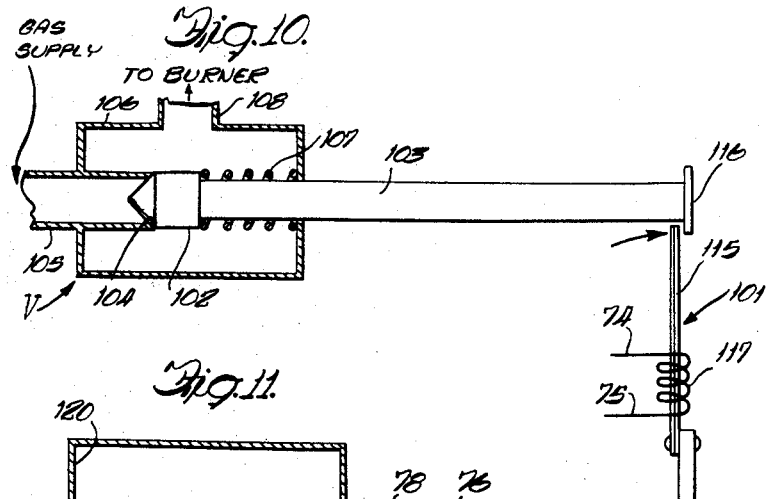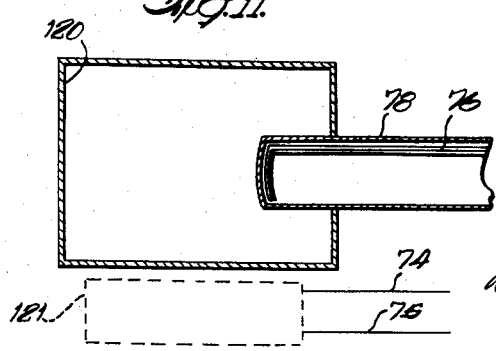

United States Patent Office 2,919,337
Patented Dec. 29, 1959

2,919,337

TEMPERATURE CONTROL FOR HEATING UNITS

Joseph E. Brosseau and John B. Brosseau, Oak Park, Ill., assignors to Joseph E. Brosseau Co., Forest Park, Ill., a corporation of Illinois Application July 18, 1956, Serial No. 598,595

12 Claims. (Cl. 219—20)

The invention relates to the control of heat producing units and it is more particularly concerned with an improved control system for regulating the heat output of heating units in accordance with the temperature of the utensils, vessels or space being heated by the elements.

The primary object of the invention is to provide a control system which is universally applicable to the control of gas or electrically operated heating units, which is quickly and easily adjustable for heating an object or space to a selected temperature, and which is operative to regulate the unit so as to maintain the object or space within very close limits of the selected temperature.

Another object is to provide a control system settable selectively to limit the heat output of a heating unit to an amount theoretically required to heat a space or object to a predetermined temperature and embodying temperature responsive means for varying the heat output in accordance with the actual requirements of the space or object being heated.

Another object is to provide a safe, reliable and accurate control system of the above general character that can be produced cheaply enough so that it can be incorporated in electric or gas kitchen ranges and the like without excessive increase in the selling price of the ranges.

Another object is to provide a control system operative to regulate a heating unit so that the contents of a cooking utensil heated by the unit is brought to a desired temperature very quickly with little or no overrun and thereafter maintained within a few degrees of that temperature.

Another object is to provide a system which affords accurate, precisely regulated control in the lower temperature ranges required for simmering and other types of slow cooking.

Another object is to provide controls which effectively prevent the overheating of a cooking vessel in case it should boil dry.

Still another object is to provide controls embodying improved means for preventing inadvertent or accidental operation of the heating unit without a cooking utensil in place thereon.

A further object is to provide electrically operated controls in which the electrical current carrying elements are assembled in a compact, unitary structure located in proximity to the heating unit but effectively protected from spillage around the unit.

Other objects and advantages of the invention will become apparent from the preferred embodiment illustrated in the accompanying drawings, in which:

Figure 1 is a plan view of an electrical heating unit equipped with a control system embodying the features of the invention, the system being shown partly in diagrammatic form.

Fig. 2 is a fragmentary view of the main pulsing unit of the control system.

Fig. 3 is a sectional view through the heating unit and controls taken in a plane substantially on the line 3—3 of Fig. 1.

Fig. 4 is an enlarged side view of one of the over-center switch devices forming a part of the controls.

Fig. 5 is a diagrammatic view showing the switch open and closed intervals of the main pulsing unit throughout its range of adjustment.

Fig. 6 is a diagrammatic view showing the switch open and closed intervals of the secondary pulsing unit throughout its range of adjustment.

Fig. 7 is a diagrammatic view showing the relationship between the contact elements of the main pulsing unit for different temperature adjustments.

Fig. 8 is a diagrammatic view showing the heating characteristics of an electric heating unit regulated by the improved controls.

Fig. 9 is a fragmentary view showing the application of the improved controls to a gas operated heating unit.

Fig. 10 is a fragmentary view showing another application of the improved controls to a gas operated heating element.

Fig. 11 is a fragmentary view showing the application of the controls to a space heating unit.

While we have shown and will describe herein in detail a preferred form and various modifications of our control system, it is to be understood that this is not intended to limit the invention to the particular constructions illustrated, but the intention is to cover all modifications and adaptations falling within the spirit and scope of the invention as expressed in the appended claims.

By way of illustration, the invention has been shown in Figs. 1–3 as applied to the control of an electrical heating unit 10 supplied with current from a three-wire line comprising line conductors L–1, L–2 and L–3, the latter being the neutral conductor. The heating unit may be of any suitable character, preferably of the unit type having a single continuous heating element. As shown in Fig. 1 of the drawings, the unit comprises a sheathed resistance heating element 11 wound in a flat, open-center spiral and presenting a top surface suitable for the support of cooking utensils or other vessels to be heated, such as the pan U shown in Fig. 3.

As shown in Fig. 3, the heating element 11 of the unit 10 is carried on the arms of a spider 12 supported on the walls of a reflector pan 13. This pan is mounted on the range structure in any preferred manner, as, for example, on a depressed flange formed around a cooking unit opening in the top panel 14 of an electric range. Terminals 15 and 16 are provided on the pan and connected with the ends of the element 11 for convenience in establishing connections with the current supply conductors. In the exemplary embodiment, a drip pan 17 is provided below the opening in the cooking top to catch any spillage around the heating unit.

The heat output of an electrical heating unit of the type above described is conveniently regulated by varying the wattage input. While that may be done by means of a rheostat or the like, it is preferred to effect the regulation by selectively varying or proportioning the "on" and "off" intervals of the current supply to the unit in successive uniform time periods or cycles of relatively short duration. That is to say, in successive periods or cycles which may be of any desired duration from a few seconds to a minute or more, current is supplied to the heating element of the unit for a predetermined portion of the cycle and the supply is then interrupted for the remainder of the cycle. The total wattage input is thus determined by the ratio of the "on" interval to the "off" interval of each cycle. By way of example, when the intervals are of equal duration, the heating element will be supplied with one-half the wattage it would normally receive if energized continuously. Similarly, if the "on' interval is a third or a fourth of the cycle, the wattage input will be only one-third or one-fourth of the continuous or normal wattage that the unit is capable of utilizing and the heat output of the unit will vary in a like ratio.

In the improved controls provided by the present invention, the selective determination of the wattage input to the heating element 11 of the unit 10 is effected by a first or primary pulsing unit 20 by periodically opening and closing a set of switch contacts 21 and 22 in a continuous uniform cycle. To this end, provision is made for oscillating one of the contacts, in this instance, the contact 21, through a substantially constant range of travel. The other contact 22 is supported so that it can follow the movements of the contact 21 and is biased so that it tends to maintain engagement with that contact through the above mentioned range. To provide for separating the contacts during a portion of the cycle, adjustable abutment means 23 is positioned to intercept the support for the contact 22 and impose a precise limit on its following movement.

While any suitable driving means may be utilized to oscillate the contact 22, it is preferred for simplicity and low cost to employ a thermally operated driver for that purpose. The contact 21 is accordingly carried at one end of a bi-metallic strip 24 which is supported at its other end on a stationary bracket 25. Disposed in heat exchange relationship to the strip 24 and preferably wound thereon is a resistant heating coil 26. One terminal of this coil is connected to the bracket 25 while the other terminal is connected with a Z-shaped conductive element 27 attached to the strip 24 adjacent its free end.

The element 27 carries a switch contact 28 adapted to coact with a contact 29 on the movable element 30 of an overcenter or snap switch. With the switch element in its leftward position as viewed in Fig. 1, contacts 28 and 29 are closed to complete an energizing circuit for the heating coil 26. As the coil heats, the free end of the strip 24 swings to the right, as viewed in Fig. 1, and the switch element 30 swings with it until it passes the central position. The switch element then snaps over to its alternate position (see Fig. 2) opening the contacts 28—29 and interrupting current flow through the heating coil 26. The coil and bi-metal strip 24 then start to cool, the strip swinging to the left, as viewed in Fig. 1, and through the medium of a hook element 31 pulling the switch member 30 with it. Such movement continues until the switch member passes its central point and snaps over to the closed position shown in Fig. 1.

The above described operating cycle is repeated as long as current is supplied to the terminal bracket 25 and switch member 30. As a consequence contact 21 is oscillated through an arc between the limits defined by opening and closing movements of the overcenter switch. It will be understood, of course, that the bimetal strip 24 does not cool down to room temperature in each cycle but that the switchover from cooling to heating takes place at some predetermined slightly higher temperature. Thus, when operations are initially started the element 24 may swing through the arc A on its initial heating and thereafter the swing will encompass a range indicated by the arc B. It will also be understood that the hot and cold limit positions of the bi-metal strip may shift somewhat as the temperature of the apparatus gradually builds up to a condition of equilibrium. The range of oscillation of the contact 21, however, remains substantially constant even though the limits may shift in one direction or the other.

To provide for its cooperation with contact 21, the contact 22 is mounted adjacent the free end of a resilient metal strip 35 which is anchored at its other end to a stationary bracket 36. The strip 35 is tensioned or biased so that it tends to follow the bi-metal strip in its swinging movement to the right upon heating. Preferably the arrangement is such that the following action is sufficient to maintain the contacts 22–21 closed throughout substantially the full range of movement of the latter contact unless the following action is interrupted by the abutment means 23.

As indicated above, the abutment means 23 is adjustable to impose a definite selected limit on the following movement of the contact 22. This abutment means, as shown, comprises a thrust rod bearing at one end against a strip 35 and having its other end positioned for cooperation with a cam 40. The particular cam illustrated is a rotary edge cam fixed to a shaft 41 by which it may be turned to present select points in its cam surface in the path of the abutment rod. In its preferred form the active surface of the cam is shaped to provide a substantially stepless adjustment between continuous contact engagement and momentary contact engagement in each cycle of the strip 24. Thus, as shown in Fig. 7, presentation of the low point of the cam to the abutment rod will allow the strip 25 and contact 22 to follow the contact 21 through the range indicated at C in Fig. 7. As progressively higher points in the cam are presented the following movement of the contact 22 will be progressively restricted as indicated at the arcs D, E, F, etc.

As stated above, this cam arrangement provides for continuous adjustment or variation of the pulsing action so that any desired ratio between the open and closed intervals of contacts 21—22 may be obtained as shown diagrammatically in Fig. 5. In that figure the rectangle shown immediately above the switch contacts is divided into two areas, the shaded area 43 representing "closed" and the unshaded area "open" intervals as the limit position of the contact 22 is progressively varied by the cam 40.

Rotational adjustment of the cam 40 may be effected in any preferred manner as by means of a fingerpiece or knob 45 fixed to the shaft 41 (Fig. 1). It will be understood, of course, that suitable indicia will be provided in association with the knob for convenience in setting the cam for a desired heat output. Preferably such indicia will be supplied in terms of temperature desired for a cooking utensil or other vessel heated by the heating unit 10.

In the exemplary controls, the shaft 41 is also utilized to open and close a main switch MS controlling the current supply to the heating unit and controls. The main switch MS as shown comprises a pair of stationary switch members 46 and 47 respectively terminating incoming conductors L–1 and L–2 of the power line. Cooperating with the stationary switch members are a pair of movable switch members 48 and 49 biased to open position and adapted to be shifted to closed position by a cam 50 on the shaft 41. Preferably the arrangement is such that when the knob 45 is turned to the "off" position the main switch is open and movement of the knob away from the "off" position immediately closes the main switch. For this purpose, one of the movable switch members, in this instance, the member 49, is provided with a follower 51 adapted to ride on the edge of the cam and to drop into a recess 52 in the cam. Movements of the switch member 49 are transmitted to the member 48 through a thrust link 53 of insulating material. Accordingly, the knob 45 serves both to turn the heating unit "on" or "off" and to select the temperature at which the heating unit is to operate.

In accordance with the invention the proportioning of the current "on" and "off" intervals as determined by the pulsing unit 20 is modified by a second pulsing unit 55 in accordance with the temperature of a cooking utensil or vessel being heated by the unit 10. More particularly, the current pulses generated by the unit 20, instead of being conducted directly to the heating element 11 of the unit, are utilized to operate the pulsing unit 55 which directly controls the current supply for the element 11. This provides a much more accurate and uniform surface temperature regulation than has heretofore been practical with electrical heating units. Furthermore, it effectually prevents any substantial overrun of the temperature of the utensil when the heating unit is first started and before the various parts of the apparatus become uniformly heated.

The pulsing unit 55 in its preferred form comprises a power element or driver in the form of a thermally responsive element or bi-metallic strip 56 anchored at one end to a stationary bracket 57, leaving its other end free to swing through an arc as the strip is heated and cooled. Heat is supplied to the strip 56 by a resistance heating coil 58 having one end connected as by a conductor 59 to the neutral line conductor L–3. The other end of the coil is connected as by a conductor 60 with the pulsing contact 22 of the unit 20. For safety purposes the latter connection is carried through a set of contacts 61—62 which are normally closed but open in case the bi-metal strip 58 is heated to a temperature effective to swing it beyond a predetermined limit position.

In the particular embodiment shown contact 61 is mounted on the bi-metal strip 58 and contact 62 is carried by a resilient strip 63 stationarily supported at one end and having its other end biased to follow the movements of the bi-metal strip. A stop 64 is positioned to intercept the free end of the strip 63 and interrupt its following movement as the bi-metal strip approaches its limit position. Further movement of the bi-metal strip beyond such position opens the contact 61—62 and interrupts the current supply to the heating coil 58.

Disposed at one side of the bi-metal strip 56 are a pair of resilient spring switch members 65 and 66 stationarily supported at their corresponding ends and having their free ends located alongside the free end of the bi-metal strip 56. By reason of a mechanical connection provided by a link 67 of insulating material the member 66 is constrained to follow the swinging movements of the bi-metal strip 56 in both directions.

The switch members 65 and 66 carry cooperating switch contacts 68 and 69 for opening and closing the current supply circuit for the heating element 11. To this end, the switch member 65 is connected by a conductor 70 with conductor L–1 of the power line. Switch member 66 is electrically connected through a metal bracket 71 with one contact of an overcenter or snap switch 72, the purpose and mode of operation of which will be described later. The other contact of this switch is connected by a conductor 74 with the terminal 15 of the heating element 11. As shown in Fig. 1, the other terminal 16 of the heating element is connected by a conductor 75 with the other side of the power line, that is, the line conductor L–2. Thus, with the main switch MS and the overcenter switch 72 closed, the energizing circuit for the main heating element 11 is closed and opened by the closing and opening of the switch contacts 68—69.

Since the heating coil 58 receives its operating current from the pulsing unit 20, that is, the coil is energized only when the pulsing contacts 21—22 are closed, the amount of heat applied to the bi-metal strip 56 is directly proportioned to the length of the "on" impulses generated by the unit. Accordingly, the strip 56 will swing or oscillate through a definite range for every setting of the control cam 40. Since the resilient switch member 65 follows the movements of the bi-metal strip, it will swing and oscillate the contact 68 through a similar range.

The contact 69 by reason of the biasing of its support member 66 tends to follow and maintain engagement with the contact 68 as the latter swings to the right upon cooling of the bi-metal strip 56. In order to correlate the operation of the pulsing unit 65 with the heating demands on the unit 10, provision is made for limiting the following movement of the contact 69 in accordance with the temperature of a cooking utensil or vessel on the heating unit. For this purpose the controls include a temperature sensing element 76 positioned to respond to the temperature of a utensil resting on the surface of the heating unit. In its preferred form the sensing element 76 comprises a bi-metal strip having one end bent over and brazed, welded or otherwise attached to the end wall portion 77 of a cup-shaped member 78 adapted to extend through the open center of the heating unit 10 and into intimate contact with the bottom of the utensil U resting on the unit.

As shown in Fig. 3, the sensing element 76 is mounted with its free end depending below the heating unit and oriented so that it tends to swing to the left when the element is heated. Such movement of the free end of the element 76 is transmitted to the switch member 66 by means of a rod 79 suitably anchored at one end to the element 76 and connected to the switch member by a lost motion connection provided, in this instance, by a hook 80 formed on the end of the rod. This lost motion connection permits the switch member to move freely to the left with the companion switch member but interrupts the following movement in the opposite direction to a predetermined limit position determined by the temperature sensed by the element 76.

The pulse or "on" and "off" proportioning action produced by the second unit 55 is illustrated diagrammatically in Fig. 6 of the drawings. Thus, the switch member 66 may be restricted in its following movement (to the right) to any position between that shown in full lines and that shown in broken lines as determined by the temperature sensed by the element 76. As this temperature increases the limit position is shifted farther to the left and consequently contact "closed" in time decreases for any given oscillatory range of the switch member 65. The latter member, of course, swings through the range determined by the setting of the pulsing element 20. Thus, the actual duration of the "on" and "off" intervals for the main heating element 11 is determined jointly by the action of the preset main pulsing unit 20 and the automatic adjustment of the pulsing unit 55 in accordance with the temperature of the vessel being heated. The continuously variable pulse rate obtainable with this unit is indicated diagrammatically by the rectangle above the pulsing contacts in which the unshaded area 81 represents "open" interval and the shaded area 82 "closed" interval.

While the rate of heating of a vessel will vary somewhat according to its physical characteristics and particularly its contents, in general the rate will follow rather closely the curve shown in Fig. 8 of the drawings. Assume, for example, that the pulsing unit 55 has been set for a temperature of 300° F. When the main switch MS is initially closed and the sensing element 76 relatively cold, the "on" interval of the main heating element will be of relatively long duration, as indicated by the line 83 which represents the temperature sensed by the element 76. This relatively long heating interval results from the fact that the limit position of the pulsing contact 69 is within the range of oscillation of the pulsing contact 68 throughout the major portion of the range. As heat is applied to the vessel by the unit 10, the temperature sensed by the element 76 increases gradually and shifts the limit positon of the contact 69 further to the left so that eventually contacts 68—69 open. After a slight cooling interval, the contacts again close and initiate another heating period which ordinarily will bring the temperature of the vessel up a further amount, as indicated by the line 84. If the vessel is empty, this heating interval may bring the temperature of the vessel to its desired value. However, if the vessel is filled with water or other material to be heated, one or more additional "on" intervals may be required for that purpose. After relatively few such "on" pulses, however, the temperature of the vessel and its contents is brought to or slightly above the desired value as indicated by the line 85 and thereafter the pulsing rate adjusts itself automatically in accordance with the vessel temperature to maintain that temperature within a degree or so of that selected by the setting of the pulsing unit 20.

It will be evident that the interaction between the two pulsing units 20 and 55 will be the same for any temperature setting of the first pulsing unit. The setting of the first unit determines the ratio of the "closed" and "open" intervals of the pulsing contacts 21—22 and thus the maximum heat output of the unit 10. This in turn determines the range through which the free end of the bi-metal strip 56 will oscillate and swing the switch member 65 and its contact 68. The temperature of the vessel U on the heating unit acts to adjust the position of the switch member 66 and its contact 69 so that the "on" and "off" intervals of the main heating element are regulated as required to maintain the desired utensil temperature as indicated by the jagged line 87.

It will be appreciated, of course, that the actual duration of the "on" and "off" intervals will vary in accordance with the heat output required to maintain a desired temperature. In the case of a vessel filled with liquid such as water, for example, it will take a substantially greater heat output to maintain the temperature than it will for an empty vessel. The controls automatically adjust for this difference and, in the event that a vessel boils dry, the adjustment prevents overheating and damaging of the vessel. The improved controls have been found exceptionally accurate in automatically regulating heating elements in the lower temperature cooking range (120°–275° F.) which has heretofore been most difficult to regulate.

In accordance with another aspect of the invention, installation of the improved controls is simplified, component parts are effectively protected from spillage and intimate contact between the temperature sensing element and the vessel being heated is insured by the novel manner in which the secondary pulsing unit and associated parts are interrelated and assembled in a compact unitary structure. Referring to Fig. 3 of the drawings, the elements of the pulsing unit 55 are supported by suitable insulating strips (not shown) within an open-topped, box-like sheet metal housing 90. At one side of the housing the walls have elongated narrow extensions 91 adapted to project under the heating unit for attachment to a suitable part of the range structure such as the reflector pan 13. An opening 92 is provided on one side of the drip pan 17 to accommodate the extensions and allow the current carrying elements of the pulsing unit to be located well to one side of the heating unit and thereby protected from spillage around the unit.

To provide for maintaining the sensing element 76 in intimate contact with the vessel U being heated on the unit 10, the sensing element is supported for limited vertical movement through the central opening in the heating element 11. It will be observed that the reflector pan 13 is also apertured for the accommodation of the sensing element. As shown in Fig. 3, the cup-shaped member 78 enclosing the sensing element is carried at one end of a rigid tubular element 93 which affords passage for the rod 79. This tubular element is supported intermediate its ends by pivot pins 94 engaging tabs 95 depending from the extensions 91 of the housing.

The pivot for the tubular element 93 may be located so that the outer end of the element overbalances the inner end and tends to swing the cup-shaped member 78 upwardly. This action may be supplemented by a spring 96 interposed between the element 93 and one of the extensions 91. Preferably the top wall 77 of the member 78 is rounded slightly to insure intimate contact with the bottom of the vessel U even though the latter may be concave or convex in form or warped into irregular contour.

The vertical movements of the sensing element supporting structure are also utilized for guarding the heating unit 10 against inadvertent operation without a vessel in place thereon. For this purpose the tubular element 93 is provided at its outer end adjacent the housing 90 with a switch operating element 97 having a pair of opposed fingers adapted to straddle the biasing tongue 98 of the overcenter switch 72. The arrangement is such that when the vessel is removed from the heating unit, allowing the member 78 to move upwardly, the switch operating element 97 is swung downwardly to push the tongue 98 down until the contact element 71 snaps overcenter to open the switch contacts 72. As explained before, those switch contacts are interposed in the circuit of the heating element 11 between the element and the pulsing contact 68—69. When a vessel is placed on the heating unit, its weight swings the operating element 97 upwardly to snap the contact element 71 over to the closed position in which it is shown in Fig. 4. Thus, the heating element is automatically turned off in the absence of a vessel from the heating unit irrespective of the settings of the controls. Waste of current is thus avoided.

The improved controls are applicable to the control of gas burners of the type used in kitchen ranges without significant modification. In such applications, the terminal conductors 74 and 75 instead of supplying energy to an electrical heating element are utilized to operate a gas valve V actuating device such as a solenoid 100 as shown in Fig. 9 or a thermal relay 101 as shown in Fig. 10.

Referring to Fig. 9, the gas valve V is shown diagrammatically and it will be understood that the valve may be of any preferred construction. In general, the valve has a movable member herein shown as a conical head 102 formed at one end of a stem 103. The head is adapted to cooperate with a complemental seat 104 formed around the inlet port of a gas line 105 opening into a valve chamber 106. In the present instance, the valve stem 103 constitutes the armature of the solenoid 100. A spring 107 acting on the head 102 urges it into engagement with the seat 104 to shut off gas flow into the chamber 106 when the solenoid 100 is deenergized. Upon energization, the solenoid shifts the valve member to open position allowing gas to flow into the valve chamber 106.

In the exemplary embodiment, the valve chamber 106 is arranged to discharge gas through a nipple 108 into a mixing chamber 109 forming a part of a gas burner 110 which may be of any preferred construction. The burner shown is a hollow annular body 111 with a row of burner ports 112 around its upper end. It will be understood that conventional pilot lighting means, preferably of the flash back type, will be provided for lighting the gas and primary air mixture issuing from the ports 112. Alternatively, a by-pass may be provided around the valve V to maintain the burner operating at low flame when the valve is closed.

The sensing element 76 and its casing 78 are associated with the burner 110 in the same manner as with an electrical heating element as previously described. More particularly, the element 76 is disposed so that it can respond to the temperature of the utensil or vessel being heated by the burner and modify the action of the pulsing unit to regulate the open and closed times of the valve V as required to maintain the utensil or vessel at a selected temperature. This modifying action is precisely the same regardless of the character of the heating unit.

In some instances it may be desirable to modulate the heat output of the burner 110 rather than merely turn it on or off. To obtain such modulating action, the valve operating solenoid 100 is replaced by the thermal relay 101 as shown in Fig. 10. This relay comprises a bi-metal strip 115 stationarily supported at one end and having its free end positioned to intercept an abutment 116 provided on the end of the valve stem 103. A heating coil 117 is wound on or mounted in proximity to the strip 115. The coil, in this instance, has its terminals connected to conductors 74 and 75 of the pulsing unit 55.

The arrangement of the relay 101 and valve V is such that when the coil 117 is energized the free end of the strip 115 is deflected to the right (as viewed in the drawing) and operates to shift the valve member 102 to open position. This admits gas to the valve chamber 106 which gas is delivered to the burner 110 as before explained.

When the current supply for the coil 117 is interrupted, the bi-metal strip cools down and permits the valve member 102 to move toward closed position under the urging of the spring 107. It will be appreciated that the movements imparted to the valve member 102 by the relay 101 are relatively slow and consequently the heat output of the burner is varied progressively. Precise regulation of the temperature of the utensil or vessel being heated by the burner is thus readily attained.

While it is believed that the improved controls will find their greatest utility in regulating the top heating elements of kitchen ranges and the like, they are by no means limited to such use. For example, they may be utilized to regulate the temperature of an oven chamber, or other space 120 to be heated as shown in Fig. 11. In such case, the sensing element 76 is mounted to respond to the temperature of the space being heated. Conductors 74, 75 from the control unit 55 are extended to the heating unit 121 for the oven when the unit is electrically operated. In the case of a gas operated unit, the conductors 74—75 extend to a valve actuator such as those described above in connection with the gas burner 110. In either case, the heat output of the unit 121 is regulated to maintain a uniform temperature in the space 120 in accordance with the setting of the control knob 45.

It will be apparent from the foregoing that the invention provides controls of a novel and advantageous character universally applicable to the control of the surface heating units of gas or electric ranges and space heating units. The improved controls effectively regulate the operation of the heating unit to maintain a vessel, cooking utensil or space being heated at a selected temperature. The novel mode of operation of the controls wherein total heat output is determined by one unit control and modified in accordance with actual temperature of the object or space being heated by an associated control unit enables the controls to regulate temperatures with a much higher degree of precision than has heretofore been practical. That is to say, the improved controls are operative to hold the object or space closer to a selected temperature with a minimum of initial overrun and a minimum of variation. Furthermore, the controls are particularly effective in the range of lower cooking temperatures which have heretofore been most difficult to control.

The approved controls also provide automatic protection against damage to a vessel that boils dry and prevent waste of current in case the vessel is removed from the heating unit while the electric current or gas is turned on. In addition to those operating advantages, the controls are characterized by their simplicity, and ease of installation which makes them inexpensive to produce and easy to install.

We claim as our invention:

1. A control system for an electrically operated heating element comprising, in combination, a first pulsing unit including a relatively stationary element and a movable element operative to periodically open and close a set of switch contacts, adjusting means settable selectively to vary the position of said stationary element and thereby determine the ratio between the open and closed intervals of said switch contacts, a second pulsing unit, an operating circuit for said second unit including said set of contacts, a member comprising a part of said second unit adapted to be oscillated through a range proportioned to the closed intervals of said set of switch contacts and another set of switch contacts opened and closed in response to the oscillation of said member controlling the current supply to the heating element.

2. A control system for an electrically operated heating element comprising, in combination, a first pulsing unit operative to periodically open and close a set of switch contacts, adjusting means settable selectively to determine the ratio between the open and closed intervals of said switch contacts, a second pulsing unit, an operating circuit for said second unit including said set of contacts, a member comprising a part of said second unit adapted to be oscillated through a range proportioned to the closed intervals of said set of switch contacts, and another set of switch contacts opened and closed in response to the oscillation of said member controlling the current supply to the heating element, and means operable independently of said first unit for varying the ratio between the open and closed intervals of said other set of contacts.

3. A control system for an electrically operated heating element comprising, in combination, a first pulsing unit operative to periodically open and close a set of switch contacts, adjusting means settable selectively to determine the ratio between the open and closed intervals of said switch contacts, a second pulsing unit, an operating circuit for said second unit including said set of contacts, a member comprising a part of said second unit adapted to be oscillated through a range proportioned to the closed intervals of said set of switch contacts, and another set of switch contacts opened and closed in response to the oscillation of said member controlling the current supply to the heating element, means responsive to the heat produced by the heating element for varying the ratio between the open and closed intervals of said other set of switch contacts.

4. A control system for an electrically operated heating element comprising, in combination, a first pulsing unit operative to periodically open and close a set of switch contacts, adjusting means settable selectively to determine the ratio between the open and closed intervals of said switch contacts, a second pulsing unit, an operating circuit for said second unit including said set of contacts, a member comprising a part of said second unit adapted to be oscillated through a range proportioned to the closed intervals of said set of switch contacts, and another set of switch contacts opened and closed in response to the oscillation of said member controlling the current supply to the heating element, means for sensing the temperature of a utensil placed to receive heat from the heating element, and means controlled by said sensing means for varying the ratio between the open and closed intervals of said other set of switch contacts.

5. In a control system for an electrically operated heating element, in combination, an elongated bi-metal strip, means supporting said strip at one end leaving the other end free to swing back and forth upon heating and cooling of the strip, a heat coil disposed in heat transfer relation to said strip, a circuit for said heat coil including a first pair of switch contacts opened and closed by said strip in swinging between predetermined limits, a resilient metal strip supported at one end adjacent the supported end of said bi-metal strip and having its other end biased to follow the swinging movements of the free end of the bi-metal strip, and a second pair of switch contacts carried by said strips, and adjustable stop means operable to limit the following movements of the resilient strip in one direction and thereby determine the portion of the range of movement of said bi-metal strip between said limit positions during which said second pair of switch contacts are closed.

6. In a control system for an electrically operated heating element, in combination, an elongated bi-metal strip, means supporting said strip at one end leaving the other end free to swing back and forth upon heating and cooling of the strip, an electric heating coil disposed in heat transfer relation to said strip, a circuit for said heating coil including a pair of switch contacts opened and closed by said strip in swinging between predetermined limits, a resilient metal strip supported at one end adjacent the supported end of said bi-metal strip and having its other end biased to follow the swinging movements of the free end of the bi-metal strip, a second pair of switch contacts carried by said strips, an abutment member positioned to block the following movement of said resilient strip in one direction, and means for adjusting the position of said abutment member to cause said second pair of switch contacts to be opened during a predetermined portion of the swing of said bi-metal strip between said limit positions.

7. The combination with an open center heating unit, of control means including a pulsing device operative to periodically start and stop the operation of the unit, an elongated member having one end positioned in the vicinity of said device and the other end disposed below the opening in said heating unit, means pivotally supporting said member for movement of said other end, toward and from the opening in the heating unit, a temperature sensing element mounted adjacent said other end of the member in alinement with the opening in the heating unit, and a linkage operatively connecting said temperature sensing element with said pulsing device, the pivot for said member being located so that the member tends to rock in a direction to project the temperature sensing element through the opening in the heating unit and into contact with a cooking vessel supported on the heating unit.

8. Control means as defined in claim 7 embodying switch means operable in response to the movement of the supporting member to close a circuit for starting operation of the heating unit when a cooking vessel is placed on the heating unit and to open the circuit when the vessel is removed from the heating unit.

9. Control means as defined in claim 8 in which the switch means and the pulsing device are spaced laterally from the heating unit sufficiently to protect them from spillage of liquid around the heating unit.

10. The combination with a gas burner having a valve biased to a closed position controlling the supply of gas thereto, a control system including an electrically operated actuator effective when energized to open said valve, a first pulsing unit operative to periodically open and close a pair of switch contacts, adjustable means settable selectively to determine the ratio between the open and closed intervals of said switch contacts, a second pulsing unit, an operating circuit for said second unit including said set of switch contacts, a member comprising a part of said second unit adapted to be oscillated through a range proportioned to the closed intervals of said set of switch contacts, another set of switch contacts opened and closed in response to the oscillation of said member, a circuit for said actuator including said other set of switch contacts, and means responsive to the temperature produced by the operation of said burner cooperating with said member to determine the ratio of the open to the closed intervals of said other switch contacts.

11. A control system as defined in claim 10 in which the electrically operated actuator is in the form of a thermally actuated relay.

12. In a control system for a gas burner, in combination, a valve actuator adapted when energized to initiate the flow of gas to said burner and to terminate the flow when deenergized, a first pulsing unit operable to generate current pulses of uniform selected length, a second pulsing unit operable by the current pulses generated by said first unit for generating current pulses of a length proportioned to that of the pulses generated by said first unit, the current pulses produced by said second unit being effective to energize said actuator, and means responsive to the temperature resulting from the operation of the burner for modifying the action of said second pulsing unit to vary the length of the pulses generated as required to maintain the temperature substantially constant.

References Cited in the file of this patent

UNITED STATES PATENTS

| | | |
|---|---|---|
| 1,994,391 | Grayson | Mar. 12, 1935 |
| 2,499,208 | Zimmer | Feb. 28, 1950 |
| 2,510,038 | Rudahl | May 30, 1950 |
| 2,552,480 | Dickey | May 8, 1951 |
| 2,575,078 | Strobel | Nov. 13, 1951 |
| 2,715,176 | Schoberle | Aug. 9, 1955 |
| 2,727,129 | Davis | Dec. 13, 1955 |
| 2,727,973 | Collins | Dec. 20, 1955 |
| 2,764,650 | Hodson | Sept. 25, 1956 |
| 2,764,665 | Walkoe | Sept. 25, 1956 |

FOREIGN PATENTS

| | | |
|---|---|---|
| 760,296 | Great Britain | Oct. 31, 1956 |